（12） United States Patent
Roth et al.

(10) Patent No.: US 10,664,986 B2
(45) Date of Patent: May 26, 2020

(54) METHOD AND SYSTEM FOR ASSIGNING SPACE RELATED RESOURCES

(71) Applicant: POINTGRAB LTD., Hod Hasharon (IL)

(72) Inventors: Itamar Roth, Tel-Aviv (IL); Haim Perski, Hod Hasharon (IL); Udi Benbaron, Netanya (IL)

(73) Assignee: POINTGRAB LTD., Hod Hasharon (IL)

(*) Notice: Subject to any disclaimer, the term of this patent is extended or adjusted under 35 U.S.C. 154(b) by 194 days.

(21) Appl. No.: 15/810,475

(22) Filed: Nov. 13, 2017

(65) Prior Publication Data

US 2018/0144495 A1 May 24, 2018

(30) Foreign Application Priority Data

Nov. 20, 2016 (IL) .......................................... 249077

(51) Int. Cl.
*G06K 9/00* (2006.01)
*G06T 7/70* (2017.01)
*G06T 11/20* (2006.01)
*G06T 7/62* (2017.01)

(52) U.S. Cl.
CPC ............ *G06T 7/70* (2017.01); *G06K 9/00369* (2013.01); *G06T 7/62* (2017.01); *G06T 11/206* (2013.01)

(58) Field of Classification Search
CPC ........... G06T 7/70; G06T 7/62; G06T 11/206; G06K 9/00369
See application file for complete search history.

(56) References Cited

U.S. PATENT DOCUMENTS

| 5,255,064 | A | 10/1993 | Maekawa |
| 6,141,433 | A | 10/2000 | Moed |
| 9,754,161 | B2* | 9/2017 | Levy ........................ G06F 3/017 |
| 10,146,318 | B2* | 12/2018 | Malzbender ............ G06F 3/017 |
| 2004/0066500 | A1 | 4/2004 | Gokturk |
| 2007/0285510 | A1 | 12/2007 | Lipton |
| 2009/0063557 | A1* | 3/2009 | MacPherson ............ G06N 5/02 |
| 2009/0202114 | A1* | 8/2009 | Morin ...................... A63F 13/12 |
| | | | 382/118 |
| 2014/0163703 | A1* | 6/2014 | Chang .............. G08B 13/19608 |
| | | | 700/90 |

FOREIGN PATENT DOCUMENTS

WO 2006105949 10/2006

* cited by examiner

*Primary Examiner* — Shefali D Goradia
(74) *Attorney, Agent, or Firm* — AlphaPatent Associates, Ltd; Daniel J. Swirsky

(57) ABSTRACT

Determining occupants' interactions in a space by applying a computer vision algorithm to track an occupant in a set of images of a space to obtain locations in the space of the occupant over time, where a history log of the occupant includes the locations of the occupant in the space over time is created and history logs of a plurality of occupants are compared to extract interaction points between the plurality of occupants.

12 Claims, 8 Drawing Sheets

METHOD AND SYSTEM FOR ASSIGNING SPACE RELATED RESOURCES

CROSS-REFERENCE TO RELATED APPLICATIONS

This application claims the benefit of priority from Israel Patent Application No. 249077, filed Nov. 20, 2016, the disclosure of which is incorporated herein by reference.

FIELD

The present invention is in the field of image analysis, specifically, the use of image analysis to assign occupants to space related resources.

BACKGROUND

The ability to detect and monitor occupancy in a space, such as a room or building, enables planning and controlling building systems for better space utilization, to minimize energy use, for security systems and more.

Hot desking or hoteling refers to an office organization system in which a single physical work space is used by multiple workers for efficient space utilization. Hot desking software systems usually allow companies to manage many space-related resources such as conference rooms, desks, offices, and project rooms.

Known hot desking systems use occupancy sensors to detect occupied work stations so that unoccupied work stations may be assigned to workers. Ideally, a hot desking system should guarantee each worker access to the right facility for the worker to be able to get the work done most efficiently. A facility may be a desk or work place in a specific resource area or in a specific team area.

Hot desking systems available to date require a worker to register or identify himself to a system which then assigns the identified worker to an unoccupied desk according to pre-set criteria. However, in today's dynamic work environments flexibility is required to guarantee that each worker gets access to the right facility. Thus, in addition to the irritation of having to register when coming to work, a worker is not guaranteed the most efficient facility.

SUMMARY

Embodiments of the invention provide a method and system for assigning occupants to facilities (also termed "work stations") in a space, based on image analysis of images of the space. In embodiments of the invention information derived from images of the space is used to understand occupants' interactions and other behavior characteristics of occupants in the space. This understanding may be used, according to embodiments of the invention, to assign the most efficient work station to each occupant, to plan a most efficient arrangement of facilities in a space and more.

BRIEF DESCRIPTION OF THE DRAWINGS

The invention will now be described in relation to certain examples and embodiments with reference to the following illustrative drawing figures so that it may be more fully understood. In the drawings.

DETAILED DESCRIPTION

Embodiments of the invention provide methods and systems for automatically assigning space related resources to occupants. The space may be an in-door space (such as a building or parking lot space) or out-door space.

Although examples described herein refer to space related resources such as work stations and allocation of work stations to human occupants, it should be appreciated that embodiments of the invention relate to all types of stations, facilities or specific spaces for work purposes or other uses and for any type of occupant.

For example, a work station according to embodiments of the invention may include a desk and the occupant a person. In other embodiments of the invention a work station includes a stall and the occupant an animal. In yet other embodiments a work station includes a parking spot and the occupant a vehicle. Other stations and occupants are included in embodiments of the invention.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "analyzing", "processing," "computing," "calculating," "determining," "detecting", "identifying" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Figure 1A:
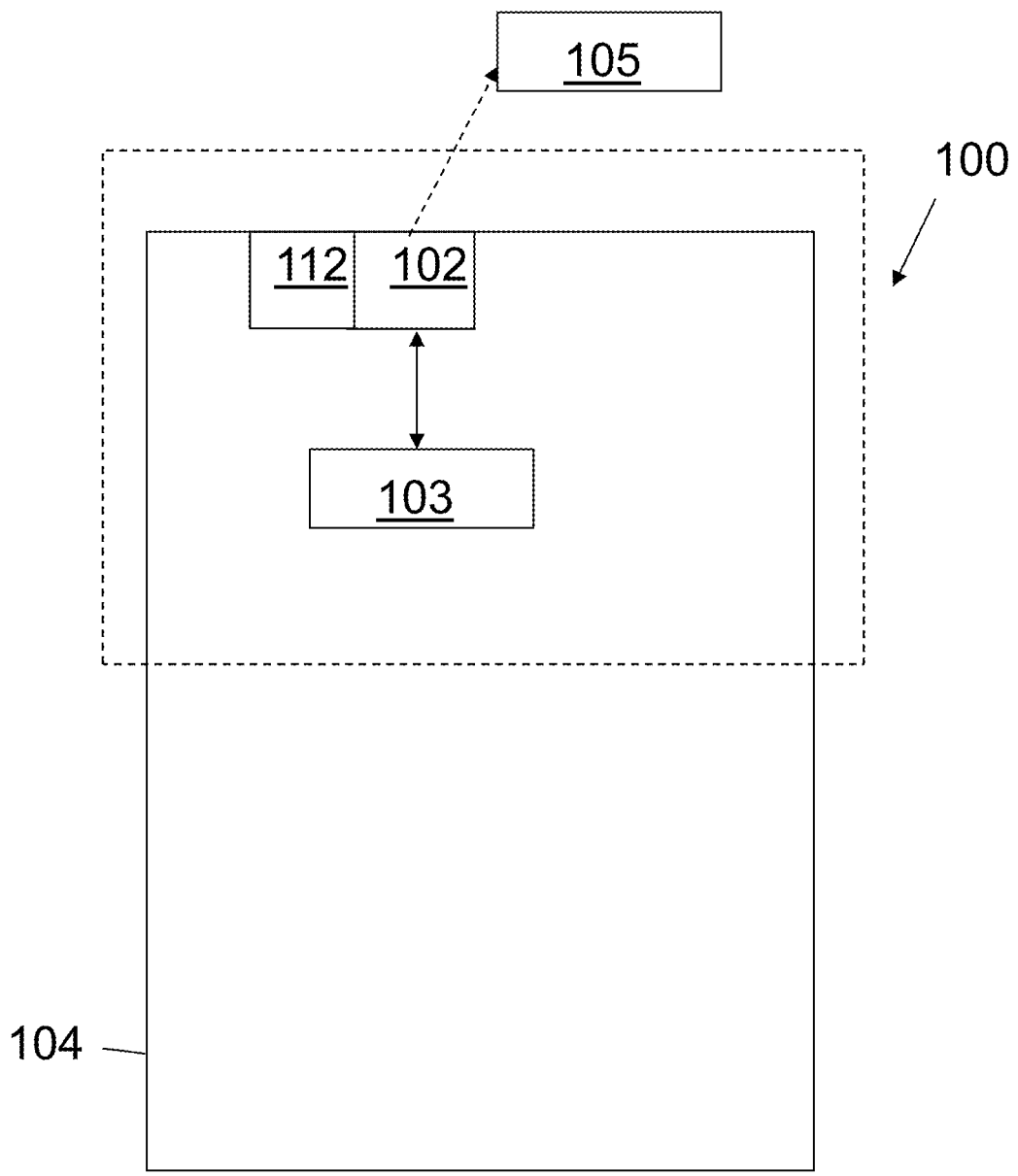
FIGS. 1A and 1B are schematic illustrations of systems according to embodiments of the invention.
Figure 1B:
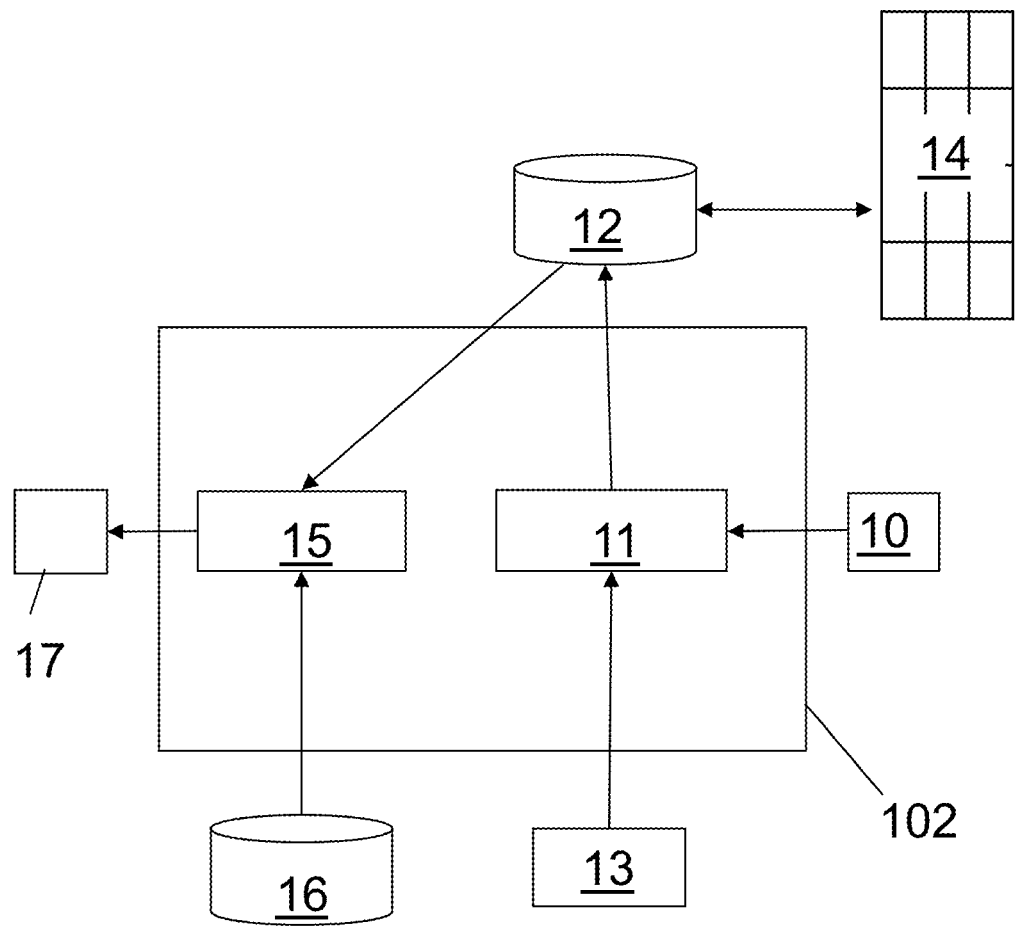

Examples of systems operable according to embodiments of the invention are schematically illustrated in FIGS. 1A and 1B.

In one embodiment, which is schematically illustrated in FIG. 1A, the system 100 includes one or more image sensor(s) 103 that can obtain images of the space 104. The image sensor 103 is associated with a processor 102 and a memory 112. In one embodiment processor 102 runs algorithms and processes to characterize an occupant based on tracking the occupant through images of the space 104, images obtained from image sensor 103. Processor 102 or another processor may then assign the occupant a work station in the space based on the occupant characterization.

For example, processor 102 may apply shape detection algorithms on images obtained from image sensor 103 to detect an occupant by its shape in the image(s) and to track the shape of the occupant.

In some embodiments different occupant characterization groups are created by processor 102 or another processor, and the occupant is added to an occupant characterization group based his characterization. The occupant is then assigned a work station based on his characterization group.

"Characterization of an occupant" may include behavior patterns of the occupant, as detected from the tracking of the occupant. For example, behavior patterns may include amount and frequency of motion paths taken by the occupant, destination and timing of motion paths, location of the paths in the space, etc.

Thus, for example, if, based on tracking an occupant it is detected that the occupant frequently walks to location X in an office building and stays at that location long periods, then the occupant may be characterized as "interacting with location X" and based on this characterization the occupant may be assigned a work station in the vicinity of location X.

In one embodiment characterization of an occupant is based on the shape of the occupant in the images. For example, tracking the occupant in images of the space may include tracking the shape of the occupant.

In another embodiment characterization of the occupant is based on a body position of the occupant (e.g., standing vs. sitting or reclining). The body position may be detected, for example, from the shape of the occupant in the images.

In some embodiments processor 102 may create a characterization of an occupant based on input from a sensor in the space that is not an imager. For example, an audio sensor may monitor sound in the space. Audio input corresponding to images of an occupant can be used in characterizing the occupant. Thus, an occupant characterization can be created based on audio information related to the occupant and, for example, an occupant characterized as "noisy" may be assigned to an area of the office where noise is less disturbing.

In some embodiments an occupant characterization can be created based on a map of the occupant's paths through the space and the occupant may be assigned a work station in the space so as to minimize the occupant's paths in the space.

According to embodiments of the invention different image-based information and possibly non image-based information can be calculated by processor 102 to provide an occupant characterization.

The occupant characterizations, as well as other signals generated by processor 102 may be output to an external device 105, for example, to be saved, further calculated, analyzed or displayed. In one embodiment a signal is output to external device 105, based on the assignment of the occupant to a work station.

The external device 105 may include a central server or the cloud. For example, external device 105 may include a processing unit that uses the output from processor 102 (or from a plurality of processors connected to a plurality of image sensors) to update seating arrangements of the space 104 or to update statistics relating to the space. In one example, space 104 may include part of an office building space in which occupants are seated in groups. The groups may be dynamic because occupants in each group can change based on past behavior or interactions of the occupant with his surroundings. Information relating to occupants' behavior may be added to statistics of the office building e.g., information regarding the number of people going to specific areas in the building at what hours, etc.

In some embodiments device 105 includes a display and assignment of occupants to work stations may be shown on the graphical interface of the display.

In some embodiments output from processor 102 is used by space related resources management system software (e.g., a smart building management system) to assign work stations in the space to occupants. For example, a system, such as a smart building management system, may use output from processor 102 to cause a visual indication to appear in vicinity of the work station assigned to an occupant. For example, once a work station is assigned to an occupant by processor 102 a signal may be sent to light up an LED or other visual indicator above the work station so that other occupants are advised of the "occupied" status of this work station. The visual indicator may be turned off once it is detected (e.g., by analysis of images of the space) that the occupant is occupying the assigned work station.

The processor 102 may be in wired or wireless communication with device 105 and/or with other devices and other processors. For example, a signal generated by processor 102 may activate a process within the processor 102 or may be transmitted to another processor or device to activate a process at the other processor or device.

A counter to count occupants and/or occupied work stations in the space 104 may be included in the system 100. The counter may be part of processor 102 or may be part of another processor that accepts output, such as a signal, from processor 102.

Processor 102 may include, for example, one or more processors and may be a central processing unit (CPU), a digital signal processor (DSP), a microprocessor, a controller, a chip, a microchip, an integrated circuit (IC), or any other suitable multi-purpose or specific processor or controller.

Memory unit(s) 112 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

According to some embodiments images obtained by the image sensor 103 are stored in memory 112. In one embodiment images obtained by the image sensor 103 are 2D images. The 2D images may be analyzed by processor 102 using image analysis methods, such as color detection, shape detection and motion detection or a combination of these and/or other computer vision methods.

For example, shape detection (or recognition) algorithms may include known shape detection methods such as an algorithm which calculates features in a Viola-Jones object detection framework. In another example, the processor 102 may run shape detection algorithms which include machine learning processes. For example, a machine learning process used to detect an occupant and/or a work station and/or an occupied work station, according to embodiments of the invention, may run a set of algorithms that use multiple processing layers on an image to identify desired image features (image features may include any information obtainable from an image, e.g., the existence of objects or parts of objects, their location, their type and more). Each processing layer receives input from the layer below and produces output that is given to the layer above, until the highest layer produces the desired image features. Based on identification of the desired image features an object such as an occupied or unoccupied work station or an occupant may be detected or identified. Motion in images may be identified similarly using a machine learning process. Objects, such as occupants, may be tracked by processor 102 through a sequence of images of the space using known tracking techniques such as optical flow or other suitable methods. In one embodiment an occupant is tracked based on his shape in the image. For example, an occupant is identified in a first image from a sequence of images as an object having a shape of a human form. A selected feature from within the human form shaped object is tracked. Shape recognition algorithms are applied at a suspected location of the human form shaped object in a subsequent image from the sequence of images to detect a shape of a human form in the subsequent image and a new selected feature from within the detected shape of the human form is then tracked, thereby providing verification and updating of the location of the human form shaped object.

In one embodiment the image sensor 103 is designed to obtain a top view of a space. For example, the image sensor 103 may be located on a ceiling of space 104, typically in parallel to the floor of the space, to obtain a top view image of the space or of part of the space 104.

Processor 102 may run processes to enable identification of objects such as stations and/or of occupants, such as humans, from a top view, e.g., by using rotation invariant features to identify a shape of an object or person or by using learning examples for a machine learning process including images of top views of objects such as work stations or other types of stations and of people or other types of occupants.

Another example of a system for assigning space related resources operative according to embodiments of the invention, is schematically illustrated in FIG. 1B. In this example images 10 are received at processor 102. A tracker 11 run by processor 102 detects and tracks an occupant in the images, typically by using image analysis techniques as described above.

Tracking an occupant may include determining locations of the occupant in the space (e.g., in relation to a floorplan of the space). In some embodiments, an appearance model may be used to tag a specific occupant and to track the specific occupant throughout images of the space.

In one embodiment, typically when analyzing top view images of a space, processor 102 may determine locations of objects in an image on the floor of the space in the image. In one embodiment location of an occupant (or other object) in an image is calculated from the detected shape of the occupant. The location on the floor in the image may then be transformed to a real-world location by the processor 102. The shape of the occupant may be used to determine his location on the floor of the space in the image by, for example, determining a projection of the center of mass of the occupant which can be extracted from the occupant's shape in the image, to a location on the floor. In another embodiment the location of an occupant on the floor in the image may be determined by identifying the feet of the occupant based on the detected shape of the occupant. The location of the feet in the image is determined to be the location of the occupant on the floor in the image. A processor may then transform the location on the floor in the image to a real world location by using, for example, projective geometry.

Characterizing features are deduced from the tracking and are input to a characterization database 12 (which may be maintained, for example, on memory 112 or externally, e.g., on a remote server or on the cloud).

In some embodiments an occupant may have an identity attached to him, for example, based on image processing of the images 10 (e.g., using face recognition algorithms) and/or by an external identifying signal 13 (such as an RF ID signal received at a time correlating to an image of the occupant or by an occupant registering to the system). Characterizations may be linked to occupant identities, for example, by using a look-up table 14.

Processor 102 may run a process 15 to assign an identified occupant a work station by matching characterizing features from database 12 to a work station from facility database 16 (which may be maintained, for example, on memory 112 or externally, e.g., on the cloud).

A signal output from 102 can be sent, for example to a display 17 to show which work station was assigned to which occupant.

In some embodiments processor 102 may create a map of occupant interactions in a space from images of the space 104 received from image sensor 103. The processor 102 may, by tracking an occupant throughout the images, obtain locations of an occupant in the space over time and may create a history log of the occupant from these locations. The created history logs and/or updated history logs of a plurality of occupants may be maintained in a database of the history logs. Processor 102 may then create a map of occupant interactions in the space based on comparison of history logs. The map typically includes locations fulfilling predetermined conditions, as further described below.

The map of occupant interactions may be displayed on display 17 or may be otherwise transmitted to an external device for further analysis and processing.

Figure 2:
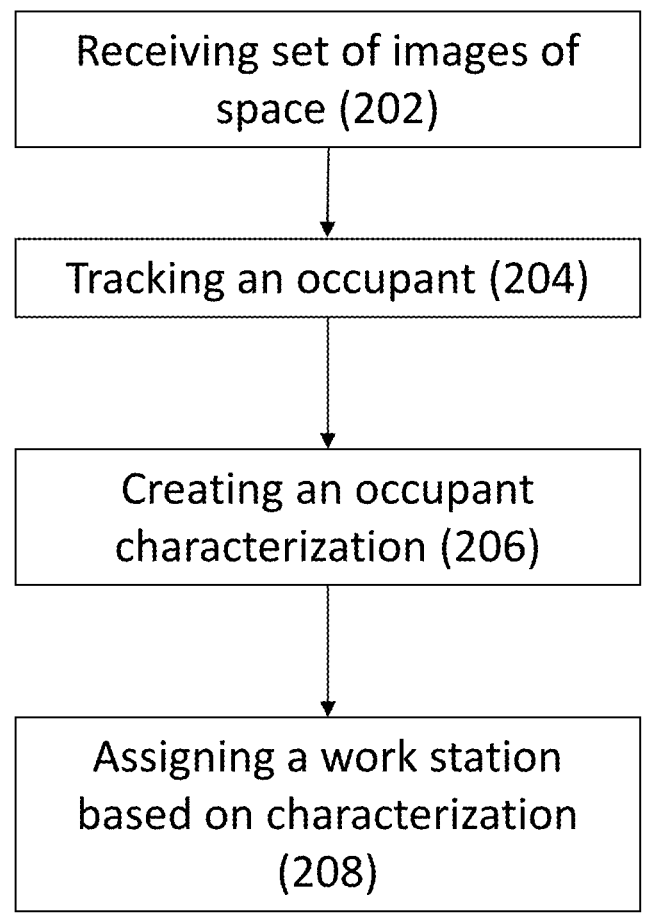
FIG. 2 is a schematic illustration of a method for automatically assigning space related resources, according to one embodiment of the invention.

An example of a method, run by processor 102, for automatically assigning space related resources, such as work stations in an office building, is schematically illustrated in FIG. 2. In one embodiment the method includes receiving a set of images of a space (202) and tracking an occupant in the set of images (204). An occupant characterization is created based on the tracking of the occupant (206) and the occupant is assigned a work station in the space based on the characterization (208).

In one embodiment the method includes detecting a shape of the occupant in the images and tracking the shape of the occupant (e.g., as described above).

In some embodiments the method includes determining a body position (e.g., standing vs. sitting or reclining) of the occupant in one or more of the images and creating an occupant characterization based on the body position of the occupant.

A body position of an occupant may be determined based on the shape of the occupant. In one embodiment the visual surrounding of the shape of the occupant in an image may be used to assist in determining the body position of the occupant. For example, the shape of an occupant in a 2D top view image may be similar to the shape of a standing occupant however based on the visual surrounding of the shape of the occupant it may be determined that the person is sitting, not standing.

Thus, in one embodiment the method may include tracking an occupant through images of the space and detecting the occupant's body position to deduce, for example, if the occupant is sitting, where he is sitting and for how long is he sitting, and creating a characterization which includes this information.

In some embodiment the characterization is created based on additional, not image-based information, such as audio information as described above.

Figure 3:
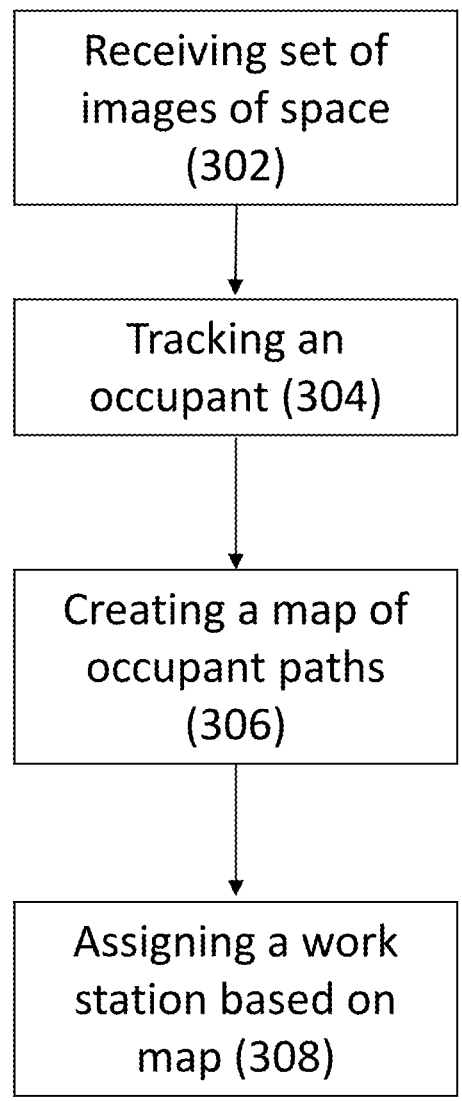
FIG. 3 is a schematic illustration of a method for automatically assigning space related resources based the occupant's paths through the space, according to an embodiment of the invention.

In one embodiment, which is schematically illustrated in FIG. 3, the method includes creating an occupant characterization based the occupant's paths through the space. In one embodiment the method includes receiving a set of images of a space (302) and tracking an occupant in the set of images (304). A map of the occupant's paths is created based on the tracking of the occupant (306) and the occupant is assigned a work station in the space based on the map (308).

A map may include, for example, a list of coordinates based on the tracking of the occupant. In some embodiments one or more of the coordinates may be associated with a time. In some embodiments a map may include a graphical presentation of the coordinates.

In one example, the occupant is assigned a work station in the space so as to minimize the occupant's paths in the space. For example, if the map created for an occupant shows most paths of the occupant to be within a certain area of the space, then the occupant is assigned a work station within that area to minimize the occupant's paths in the office.

In a setting where allocation of work stations is required, such as in an office, there are typically more than one occupant in need of a work station. Thus, attaching an identity (e.g., an identifying tag) to an occupant may assist in differentiating between occupants and connecting between an occupant and the occupant characterization and/or map of paths.

In one embodiment the method includes tracking an occupant in a first set of images and attaching an identity to the tracked occupant. The method further includes detecting the identified occupant in a second, later, set of images and assigning the occupant detected in the second set of images a work station based on the identity of the occupant.

Figure 4:
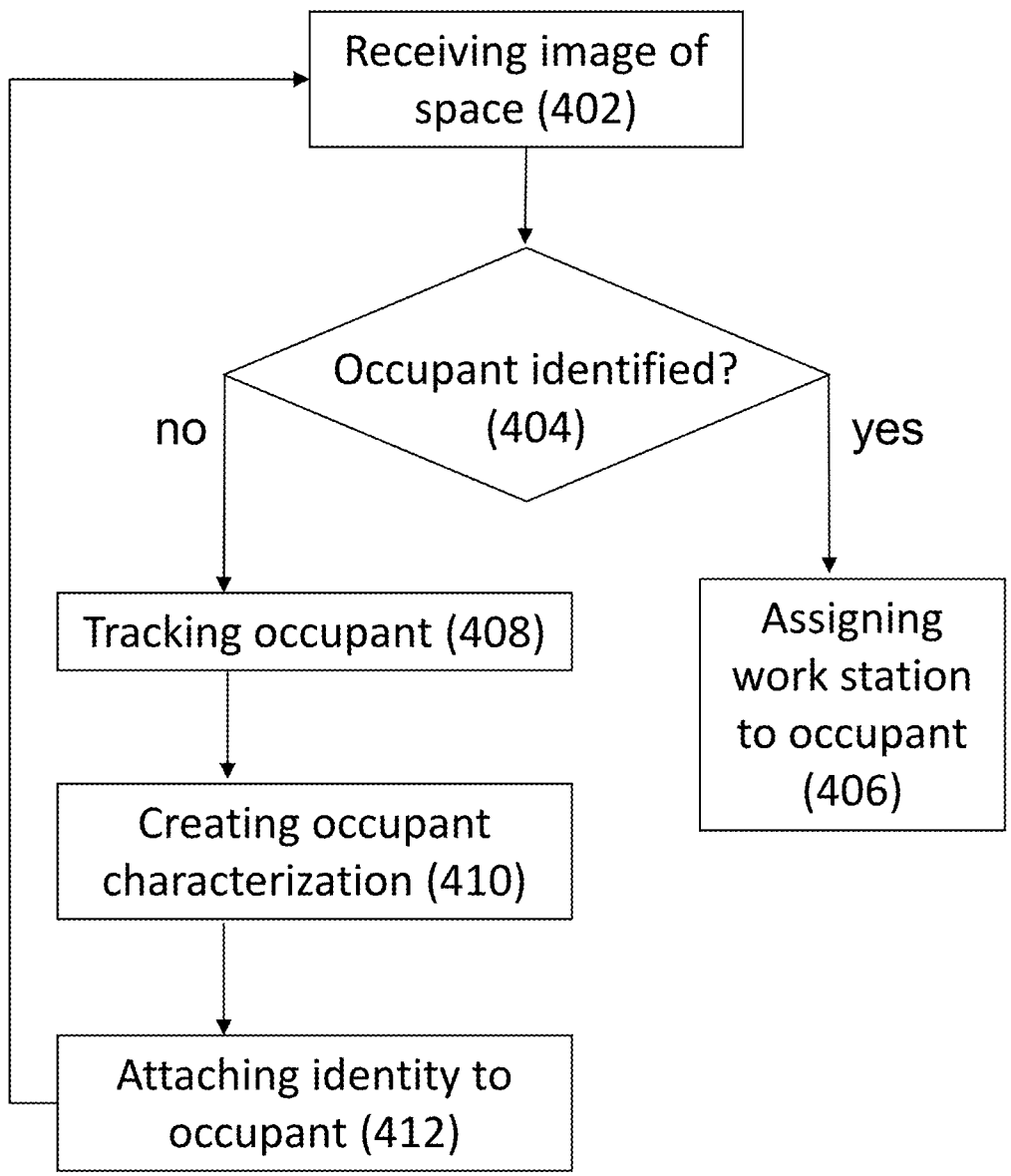
FIG. 4 is a schematic illustration of a method for automatically assigning space related resources while attaching an identity to an occupant, according to an embodiment of the invention.

In one example, which is schematically illustrated in FIG. 4, the method includes receiving a set of images of a space (402). If an occupant is identified in the images (404) then a work station is assigned to the occupant based on the identification (406). However, if an occupant is not identified in the images then the occupant is tracked in the images (408) and an occupant characterization is created based on the tracking of the occupant (410). An identity is attached to the occupant (412) so that he may easily be assigned a work station in the next set of images.

In one embodiment different occupant characterization groups are created. An occupant is assigned to an occupant characterization group based on his characterization and the occupant is then assigned a workstation in the space based on the occupant characterization group of the occupant.

Figure 5:
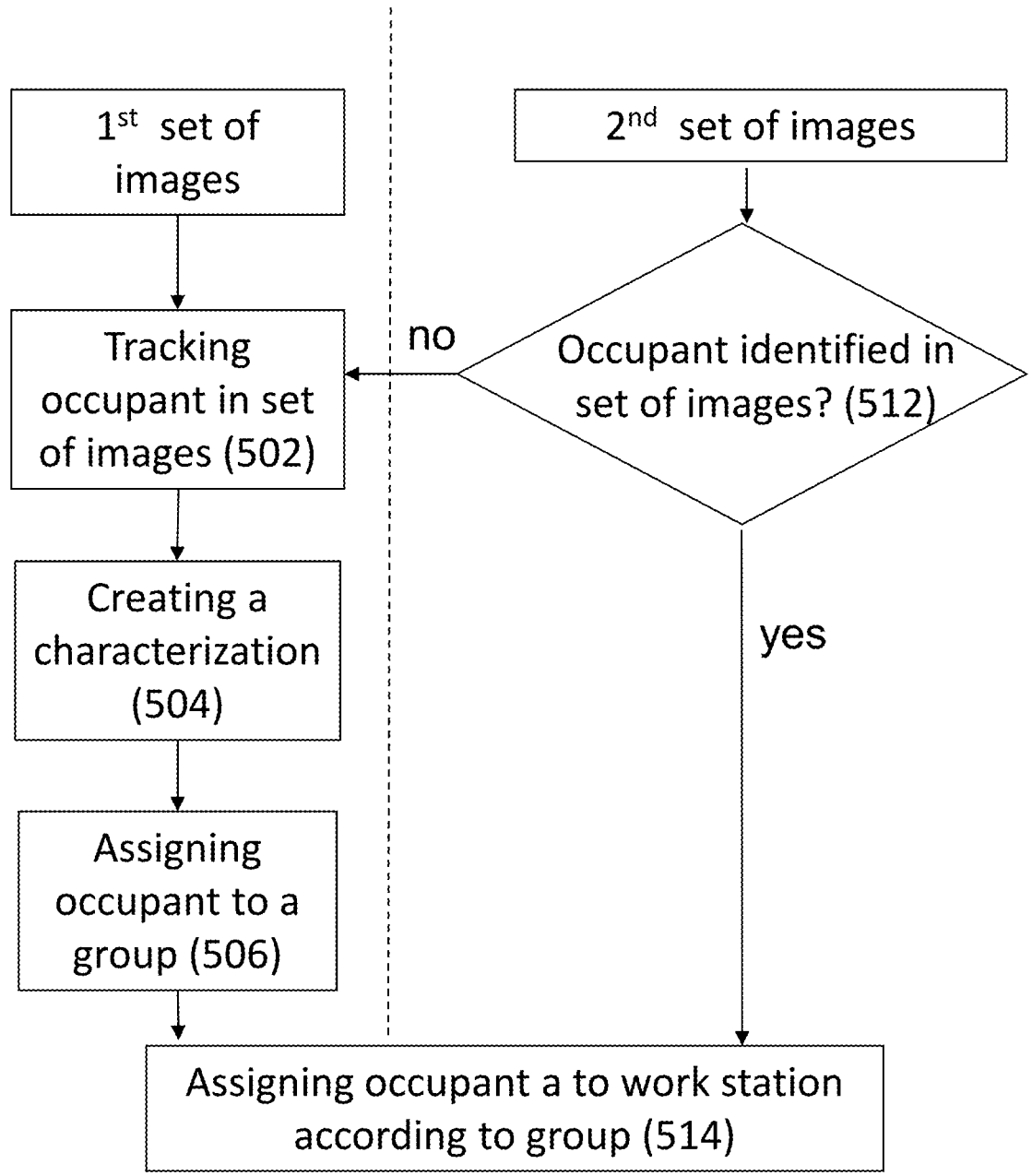
FIG. 5 is a schematic illustration of a method for automatically assigning space related resources based on characterization groups, according to an embodiment of the invention.

In one embodiment which is schematically illustrated in FIG. 5, an occupant is tracked in a first set of images of the space (502). A characterization is created for the occupant based on the tracking (504) and the occupant is assigned to a group based on the characterization (506) and the occupant is assigned a work station according to his group (514).

The characterizations and/or group may be maintained in a database, e.g., database 12. Typically an identification is attached to the occupant and saved, e.g., in look-up table 14.

If the occupant is identified in a second set of images of the space (512), then the occupant is assigned a work station according to his group (514). If the occupant is not identified in the second set of images (512) then he is tracked and assigned to a group as described above.

A group may be created, for example, based on an occupant's behavior or characteristics, e.g., based on how noisy the occupant is. In another example, similar maps of occupant paths may be included in the same group.

In one embodiment, a history log of the occupant is created based on the tracking of the occupant. When the occupant is subsequently identified (in a second, later, set of images), the occupant is assigned a work station in the space based on the history log.

Figure 6:
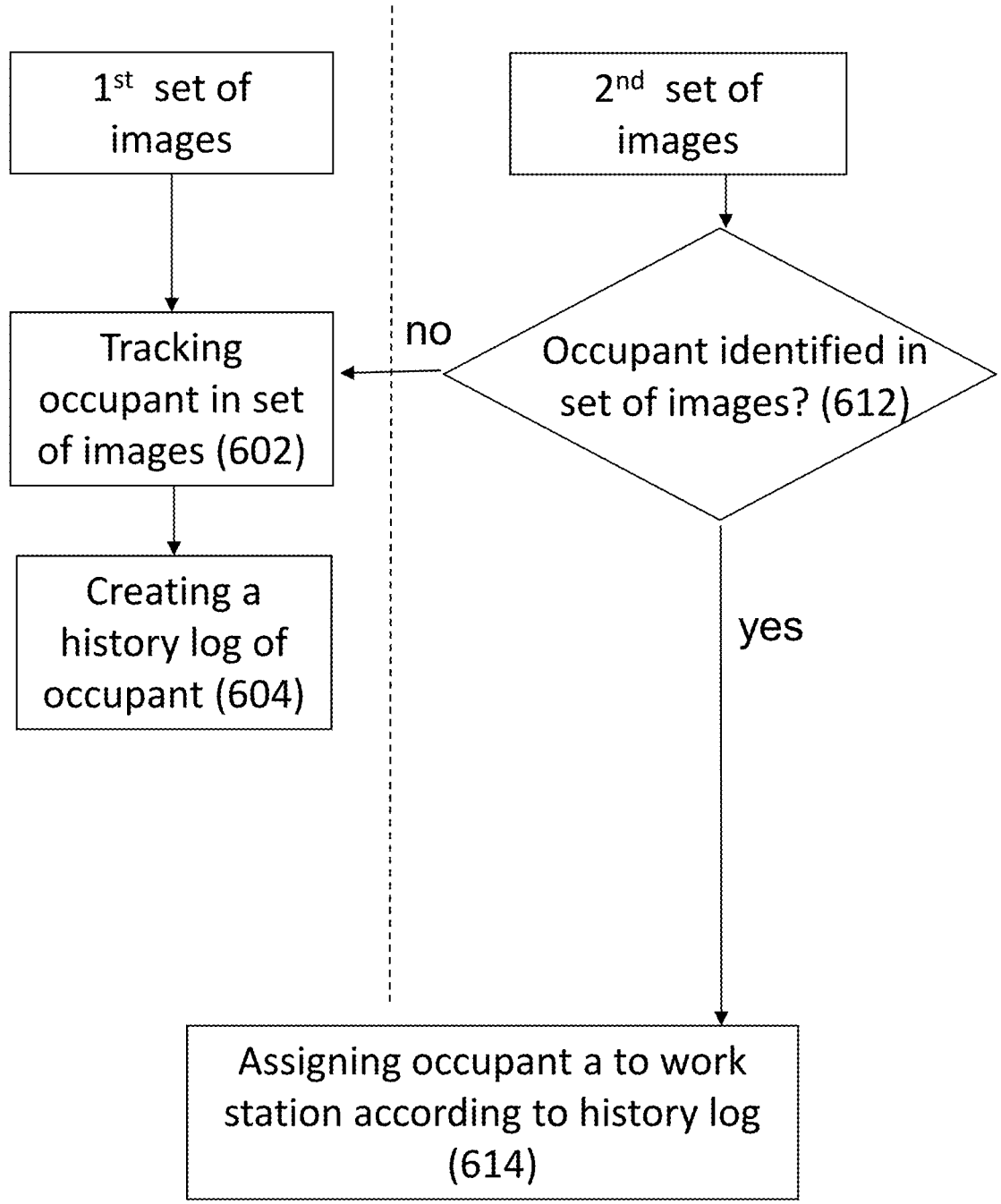
FIG. 6 is a schematic illustration of a method for automatically assigning space related resources based on a history log of the occupant, according to an embodiment of the invention.

In one example, which is schematically illustrated in FIG. 6, an occupant is tracked in a first set of images of the space (602) and a history log of the occupant is created based on the tracking of the occupant (604). Typically an identity is attached to the occupant (e.g., as described above).

The history log may be maintained in a database, e.g., database 12 and the identification attached to the occupant may be saved, e.g., in look-up table 14.

If the occupant is identified in a second, subsequent, set of images of the space (612), then the occupant is assigned a work station according to his history log (614). If the occupant is not identified in the second set of images (612) then he is tracked, identified and a history log is created for him, as described above.

In some embodiments the method includes detecting a shape of an occupant in the subsequent set of images (e.g., based image analysis techniques as described above) and identifying the shape of the occupant as the occupant, namely, attaching an identity to the shape of the occupant. For example, an identity may be attached to the shape of the occupant based on image analysis of the subsequent set of images (e.g., by applying face recognition algorithms on the subsequent set of images to identify a face of an occupant detected in the first set of images).

The history log may include occupant interactions in the space. For example, the history log may include occupant paths in the space, lengths and duration of the paths, locations frequently visited by the occupant, time of arrival/departure at work station, frequency of departures from the work station, etc.

In one embodiment the history log may include non-image-based information related to the occupant (e.g., audio information, as described above).

Assigning a work station based on information deduced or calculated from tracking of the occupant, such as described herein, ensures a better fit between the occupant's needs and the assigned work station, providing the occupant with a uniquely suitable work station.

Figure 7:
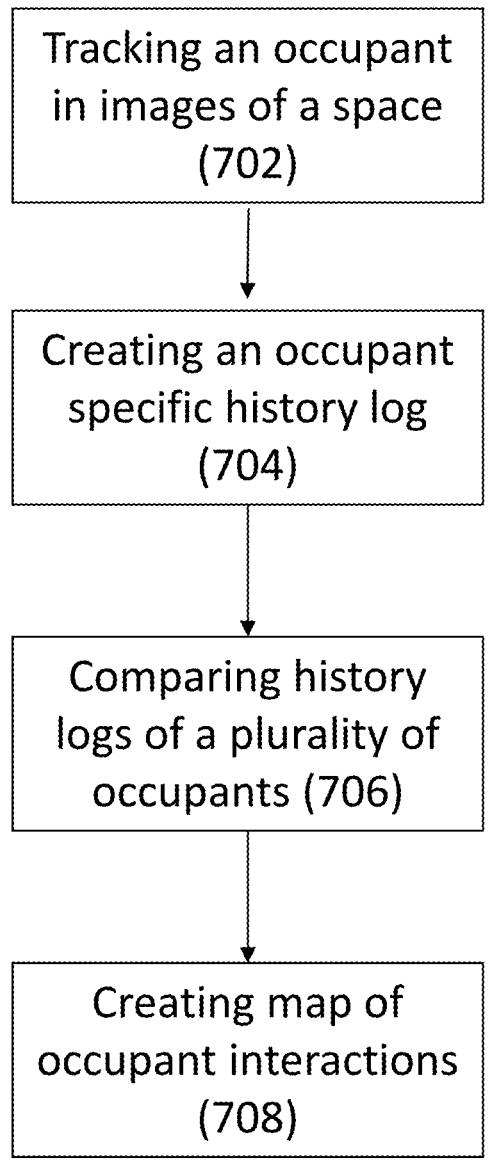
FIG. 7 is a schematic illustration of a method for automatically creating map of occupant interactions in a space, according to an embodiment of the invention.

In one embodiment, an example of which is schematically illustrated in FIG. 7, history logs of a plurality of occupants can be used to determine occupants' interactions in a space, such as an office space.

An occupant is tracked, e.g., by processor 102, in a set of images (e.g., obtained by image sensor 103) of the space to obtain locations of the occupant over time by applying a computer vision algorithm (702). Typically, the computer vision algorithm, such as an appearance model, enables differentiating between occupants, locating the same occupant in images of the space and creating an occupant specific history log (704). In one embodiment the history log of the occupant includes information such as locations of the occupant in the space over time. The method further includes the step of comparing the history logs of a plurality of occupants (706) to extract interaction points between the plurality of occupants. A map of occupant interactions is then created from the interaction points (708).

Interaction points typically include locations in the space in which predefined conditions are fulfilled.

For example, interaction points may include locations in the space in which a number of occupants, which is above a specified threshold, are located within a defined time period. In another embodiment interaction points include locations in the space in which at least two occupants are located for a time period over a specified threshold.

For example, building space management personnel may be interested in identifying locations in the building where 3 or more people convene for a time period of over 5 minutes, or, for example, a time period in between 5 and 10 minutes. Thus, a threshold of 3 occupants may be specified (e.g., through building management software) and a time period threshold of 5 minutes or a range of between 5 and 10 minutes may be specified to identify the interaction points of interest to the building management personnel.

In other embodiments interaction points may include locations in the space in which at least two occupants are located within a defined time period, in a repetitive pattern. For example, an interaction point may include a location where, for example, 100 or more people, convene every Sunday.

In some embodiments history logs, which include locations of occupants in the space over time, may include locations in the space where no occupants ever pass or stop, or for example, where no occupants pass or stop on Sundays. Thus, interaction points may be locations in which no occupants or a number of occupants below a predetermined threshold are detected.

In some embodiments processor 102 may use a shape detection algorithm to detect if a body position of the occupant in one or more images of the space, is sitting or standing and may detect interaction points as location in the space in which a sitting body position of an occupant is detected.

A summation or other aggregation of interaction points detected according to embodiments of the invention, may be used to create a map of occupants' interactions in the space.

Embodiments of the invention enable receiving information from a large number of interactions between anonymized occupants and their usage of a space and may enable discovering unknown trends and patterns to better manage and utilize space.

What is claimed is:

1. A method for determining occupants' interactions in a space, the method comprising:
    applying a computer vision algorithm to track an occupant in a set of images of a space to obtain locations in the space of the occupant over time;
    creating a history log of the occupant, based on non-image-based information related to the occupant, the history log comprising the locations of the occupant in the space over time; and
    using a processor
        to compare the history logs of a plurality of occupants to extract interaction points between the plurality of occupants, and
        create a map of occupant interactions from the interaction points.

2. The method of claim 1 wherein the computer vision algorithm comprises detecting a shape of the occupant and tracking the shape of the occupant.

3. The method of claim 1 wherein interaction points comprise locations in the space in which a number of occupants above a specified threshold are located within a defined time period.

4. The method of claim 1 wherein interaction points comprise locations in the space in which at least two occupants are located for a time period over a specified threshold.

5. The method of claim 1 wherein interaction points comprise locations in the space in which at least two occupants are located within a defined time period, in a repetitive pattern.

6. A system comprising:
    a processor configured to
        receive images of a space,
        create a history log of an occupant based on tracking of the occupant through the images of the space to obtain locations in the space of the occupant over time,
        maintain a database of the history logs, and
        create a map of occupant interaction in the space based on comparison of history logs, the map comprising locations fulfilling predetermined conditions.

7. The system of claim 6 comprising an image sensor to obtain the images of the space.

8. The system of claim 7 wherein the image sensor is configured to obtain top view images of the space.

9. The system of claim 6 wherein the processor is configured to create a map of occupant interactions comprising locations in the space in which at least two occupants are located for a time period over a specified threshold.

10. The system of claim 6 wherein the processor is configured to create a map of occupant interactions comprising locations in the space in which at least two occupants are located within a defined time period, in a repetitive pattern.

11. The system of claim 6 wherein the processor is configured to apply a shape detection algorithm on the images to detect if a body position of the occupant is sitting or standing and creating a map of occupant interactions comprising locations in the space in which a sitting body position of an occupant is detected.

12. A method for determining occupants' interactions in a space, the method comprising:
    applying a computer vision algorithm to track an occupant in a set of images of a space to obtain locations in the space of the occupant over time;
    using a shape detection algorithm to detect if a body position of the occupant is sitting or standing;
    creating a history log of the occupant comprising the locations of the occupant in the space over time; and
    using a processor
        to compare the history logs of a plurality of occupants to extract interaction points between the plurality of occupants, wherein the interaction points comprise locations in the space in which a sitting body position of an occupant is detected, and
        create a map of occupant interactions from the interaction points.

* * * * *